United States Patent [19]

Sparapany et al.

[11] Patent Number: 4,758,398
[45] Date of Patent: Jul. 19, 1988

[54] METHOD OF MANUFACTURE PREFORMS

[75] Inventors: John J. Sparapany, Allegany, N.Y.; Lewis Erwin, Winnetka, Ill.; Kevin J. Prey, Allegany, N.Y.

[73] Assignee: The Dexter Corporation, Windsor Locks, Conn.

[21] Appl. No.: 916,307

[22] Filed: Oct. 7, 1986

[51] Int. Cl.⁴ ............................................. B29C 47/12
[52] U.S. Cl. ..................... 264/151; 83/875; 264/118; 264/211.24; 264/DIG. 59
[58] Field of Search ............. 264/143, 148, 151, 236, 264/211.24, 347, 118, DIG. 59; 83/875, 880

[56] References Cited

U.S. PATENT DOCUMENTS

| | | | |
|---|---|---|---|
| 2,403,476 | 8/1944 | Berry et al. | 425/DIG. 55 |
| 3,379,814 | 4/1968 | Bracey, Jr. | 83/880 |
| 3,988,085 | 10/1976 | Krchma | 264/141 |
| 4,001,368 | 1/1977 | Michizoe et al. | 264/236 |
| 4,088,721 | 5/1978 | Apicella, Jr. | 264/151 |
| 4,221,753 | 9/1980 | Bradbury | 264/143 |
| 4,237,082 | 12/1980 | LaSpisa et al. | 264/148 |
| 4,418,030 | 11/1983 | Muller et al. | 264/143 |
| 4,420,881 | 12/1983 | Bourget | 264/150 |
| 4,462,526 | 7/1984 | Dumont et al. | 264/118 |
| 4,551,293 | 11/1985 | Diehl, Jr. et al. | 264/DIG. 59 |
| 4,631,161 | 12/1986 | Powpow | 264/236 |

FOREIGN PATENT DOCUMENTS 59-177502  8/1984  Japan.

OTHER PUBLICATIONS

Plastics Technology 28(2):31 (1982).
Handbook of Composites, ed. George Lubin, pp. 419-422.

Primary Examiner—Richard V. Fisher
Assistant Examiner—Coreen Y. Lee

[57] ABSTRACT

A method of preparing a plurality of thermoset resin preforms by extruding a rod, cooling the rod to retain its dimensional uniformity and to reduce further curing of the resin, forming a plurality of grooves in the rod, and fracturing the rod at the grooves to yield the preforms.

13 Claims, 3 Drawing Sheets

METHOD OF MANUFACTURE PREFORMS

BACKGROUND OF THE INVENTION

This invention relates to preparing preforms.

Preforms are thermoset preparations used in thermoset molding processes. They consist of a thermoset resin which is not fully cured, and often contain fillers, reinforcements, and additives. Preforms are usually prepared in the form of pills, biscuits, or tablets. Preforms are typically prepared from preprocessed thermoset resins, which are produced by mixing a granular thermoset resin with the desired reinforcements, fillers, and additives in a preprocessing extruder. The preprocessed resin is extruded from the preprocessing extruder as a thick, shapeless paste, which is then cooled and formed into a sheet. The sheet is ground into a fine powder, which is then compacted under pressure to form the preforms.

SUMMARY OF THE INVENTION

In a first aspect, the invention features preparing preforms by extrusion. Preprocessed thermoset resin mixture is fed to an extruder, which extrudes a rod. The extruded rod is immediately cooled, and then broken or cut into segments to form the preforms. In preferred embodiments, the rod is cylindrical; its diameter is from about 0.25 to 2 inches, more preferably from about 0.50 to 1.25 inches; cooling of the extruded rod is accomplished by exposing its surface to cold fluid; the output of the preprocessing extruder is supplied directly to the preform extruder, which has sufficient internal cooling to rapidly lower the temperature of the preprocessed resin.

In a second aspect, the invention features forming a plurality of spaced-apart grooves in a rod and fracturing the rod at the grooves to yield the preforms. In preferred embodiments, the grooves are formed by embossing (e.g., by using a heated embossing tool) and are V-shaped.

The invention provides preforms exhibiting uniform diameter, height, composition, and density. The preforms are comparatively inexpensive, and are made with less waste of material. They are resistant to breakage and to the accumulation of dust during shipping and handling. Their uniform properties cause them to heat uniformly, facilitating their use in forming fully-cured thermoset articles. The extrusion process increases the density of the preforms by reducing the amount of entrapped air. Contamination of the preforms is reduced by eliminating the handling, transporting, and compacting steps necessary when preforms are prepared by compacting powder. The reduced contamination makes the preforms especially suited for use in molding the packaging for semiconductor devices.

Other features and advantages of the invention will be apparent from the following description of preferred embodiments and from the claims.

DESCRIPTION OF PREFERRED EMBODIMENTS

Figure 5:
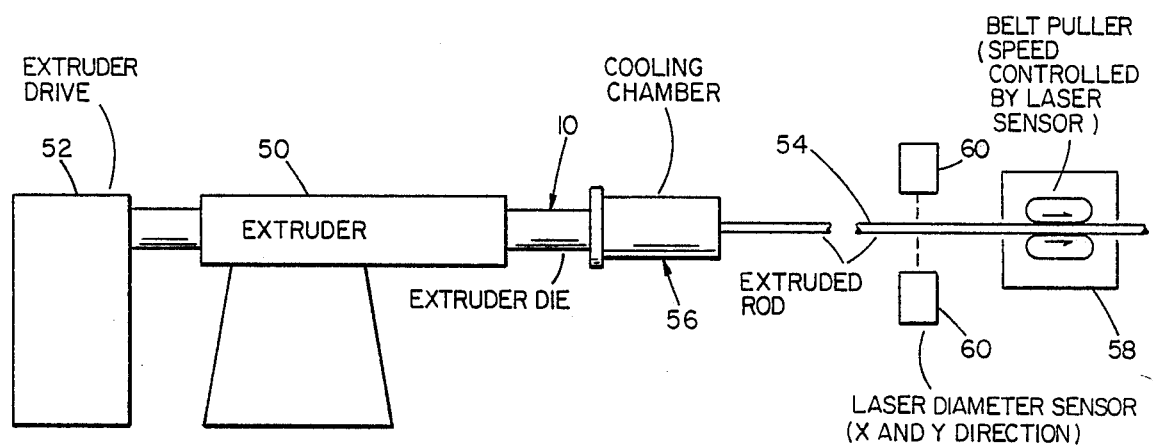
FIG. 5 is a diagrammatic view of the extruder and associated equipment for extruding the rod.

The equipment used to extrude the cylindrical rod from which the preforms are fractured is shown in FIG. 5. Extruder 50, driven by drive 52, extrudes cylindrical rod 54 through die 10. The extruded rod 54 is cooled in cooling chamber 56 as it emerges from the die. The rod is pulled by speed-controlled belt puller 58, whose speed is governed by the diameter measurement made by laser diameter sensor 60, which measures along both the X and Y directions. Control of the rate at which the rod is pulled assures uniformity of rod diameter and concentricity.

Examples of suitable preprocessed thermoset resins for preparing cylindrical preforms include, e.g., unsaturated polyester resins and epoxy resins, admixed with fillers (e.g., silica), reinforcements (e.g., glass fibers), and additives (e.g., colorants). The preprocessed thermoset resin is prepared using a conventional preprocessing extruder (not shown) at a temperature of about 220° F. to 265° F. for a period of typically less than one minute. The preprocessed thermoset resin is supplied directly to the preform extruder 50 from the preprocessing extruder. The preform extruder is provided with internal cooling for rapidly lowering the temperature of the preprocessed resin by about 60° to 100° F.

Figure 1:
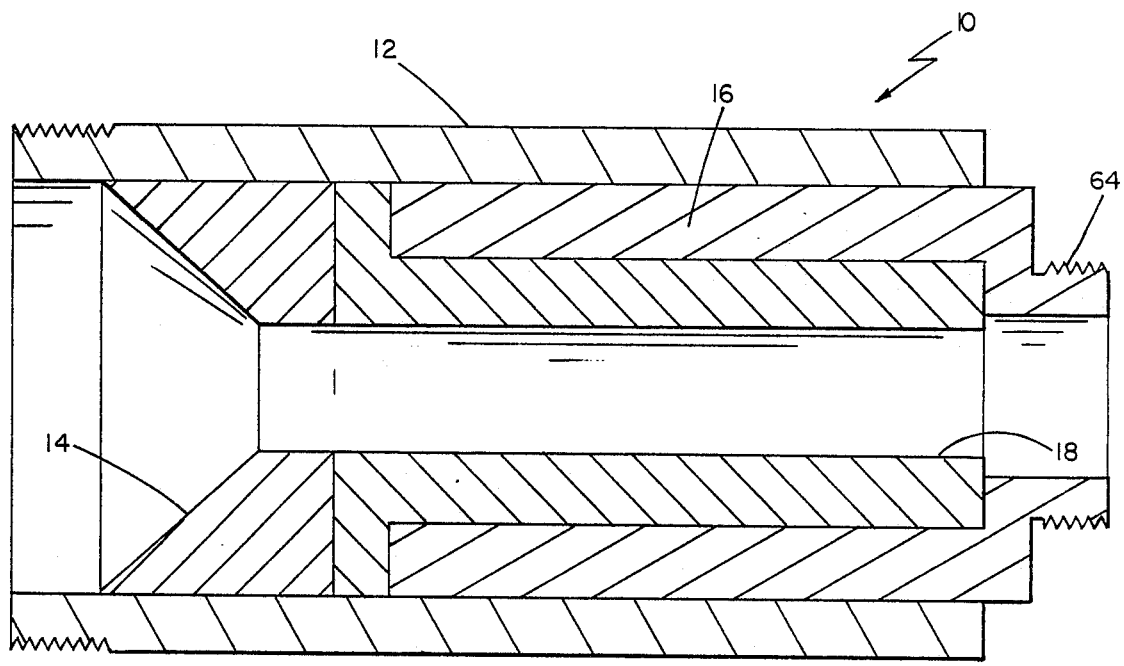
FIG. 1 is a cross-sectional view of the extruder die for extruding the cylindrical rod, subsequently fractured to form the preforms.

The extruder die 10 is shown in FIG. 1. Reducer ring 14 receives the uncured thermoset resin from the extruder and forces the resin through a low friction surface liner 18. Reducer ring 14 is made from a hard, abrasion-resistant material, e.g., boron nitride-coated steel, capable of withstanding the extrusion pressures encountered during the preparation of the cylindrical preforms; typical extrusion pressures range from about 200 to 3,000 psi. Reducer ring 14 is held in position by set screws (not shown) through die body 12. The inside diameter of reducer ring 14 is preferably at least 1/32 inch smaller than the diameter of liner 18 in order to allow for some internal die swell during the extrusion process. Liner 18 is held in place by a retainer core 16 and is preferably a low friction surface material, e.g., Teflon, in order to minimize surface drag and die swell during the extrusion process. The inside diameter of liner 18 is preferably within 1/16 inch of the desired diameter of the cylindrical preform. The length of liner 18 is preferably at least 2.5 times its inside diameter in order to minimize die swell as the cylindrical rod exits the liner.

Figure 6:
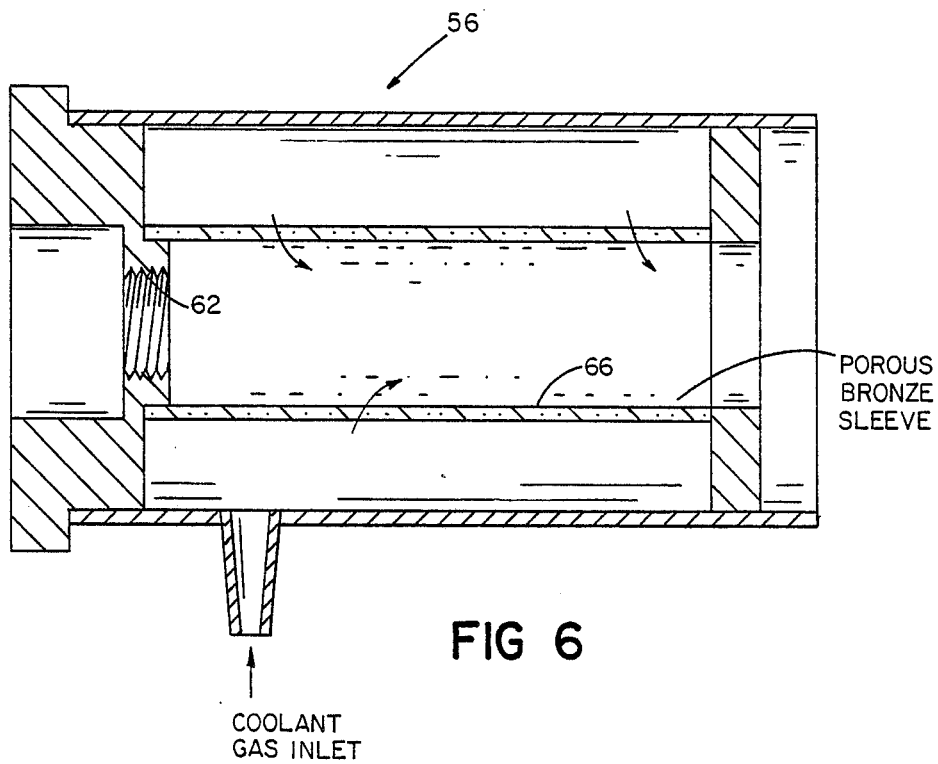
FIG. 6 is a cross-sectional view of the cooling chamber downstream of the extruder die.

The extruded rod leaving die 10 passes through cooling chamber 56 (FIG. 6), which has threaded bore 62 for making a connection to threaded end 64 of die 10 (FIG. 1). The extruded rod passes through porous bronze sleeve 66, through which coolant gas (cold N₂) passes. Cooling the rod assures that the rod retains its dimensional uniformity (i.e., uniform diameter and concentricity). Cooling also prevents the resin from further curing. It has been found that the extrusion procedure does not produce any detectable advance in the curing of the thermoset resin in spite of the necessary further heating of the resin.

Figure 2:
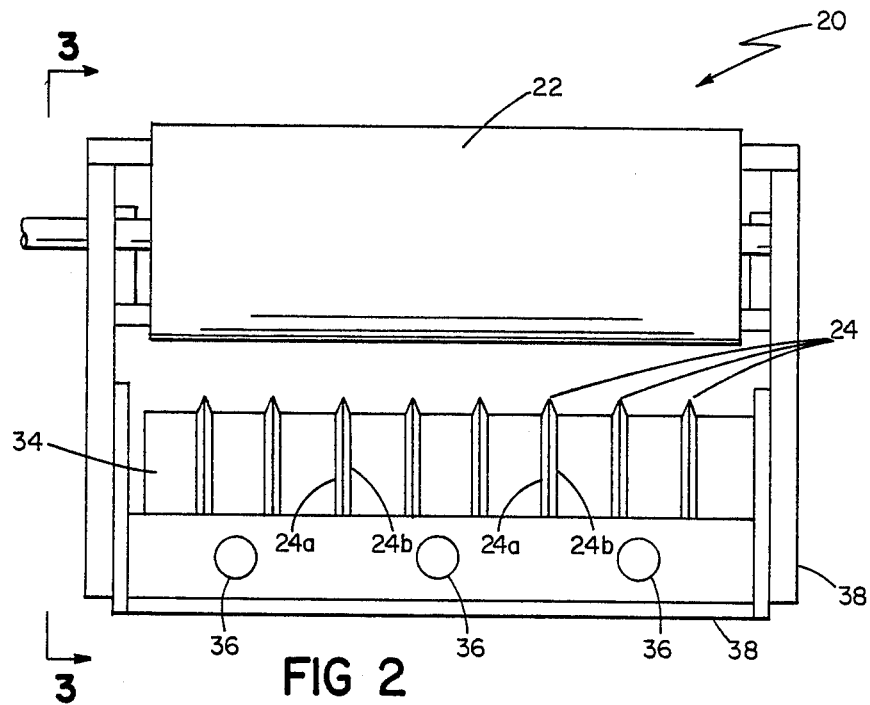
FIG. 2 is an end view of an embossing tool for creating V-shaped grooves in the cylindrical rod.
Figure 3:
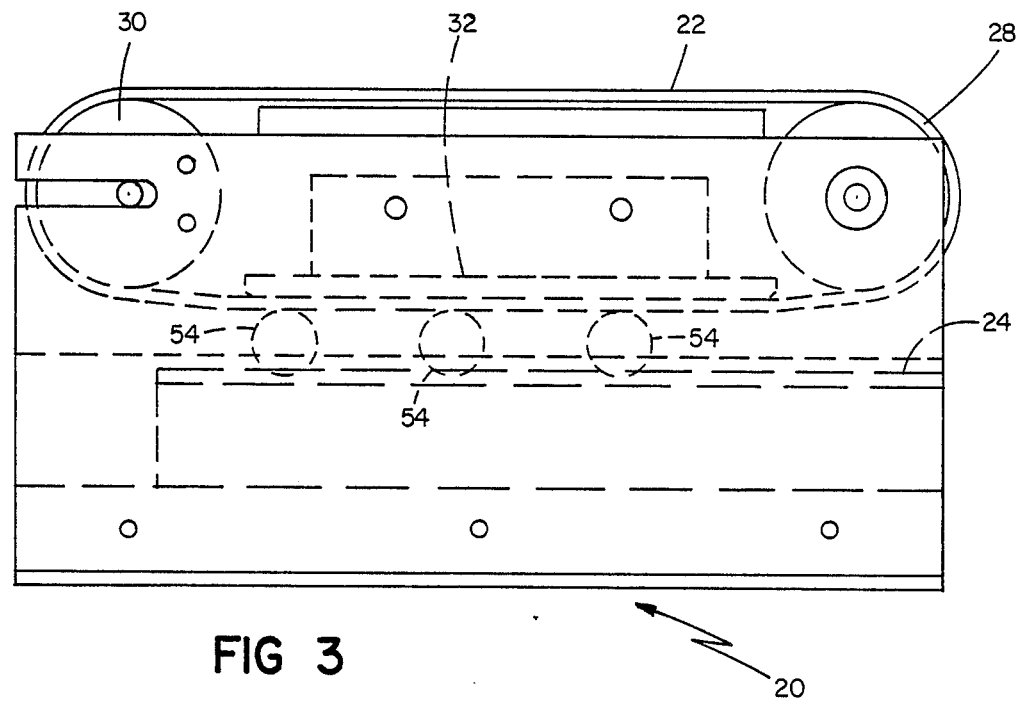
FIG. 3 is a side view of the embossing tool, at 3—3 in FIG. 2.

Embossing tool 20 (FIGS. 2 and 3) is used to create V-shaped grooves in the extruded cylindrical rod. V- shaped grooves are preferred because the sharp angle at the base of such grooves efficiently localizes shear and tensile fracture stresses, rendering the preforms easier to fracture, and results in a flat, uniform fracture surface. Embossing tool 20 has a rubberized belt 22 which provides a nonslip surface for rolling long sections of the extruded rod 54 over embossing blades 24 (FIG. 3). Belt 22 is driven by a conventional variable speed motor (not shown) which engages a drive roller 28; a take-up roller 30 takes up belt 22. A spring-loaded pressure plate 32 maintains uniform pressure along the extruded rods as they roll over embossing blades 24 and prevents belt 22 from buckling.

Embossing blades 24 consist of pairs of adjacent blades 24a and 24b (each providing half of the V shape) separated by spacer bars 34; the V-shaped tips of embossing blades 24 extend over the tops of spacer bars 34 to produce V-shaped grooves in the extruded cylindrical preforms as they roll over the blades. The separation of the embossing blades 24 determines the length of the preforms after they are formed by fracturing the rod. Typically, the blade separation ranges from about 0.5 to 2.0 inches. Embossing blades 24 are heated using conventional cartridge heaters (not shown) inserted in heater wells 36; heating facilitates the grooving process by softening the extruded cylindrical preforms. Thermal insulation 38 is used to minimize heat loss. The ratio of groove depth to preform diameter preferably ranges from about 1:8 to 1:10 (the grooves are shown larger than actual size in FIG. 4). Thus, groove depths range from 1/16 inch for ½ inch diameter preforms to ⅛ inch for 1¼ inch preforms. Deeper grooves can be used as long as a sharp angle at the base of the groove is maintained. The embossing temperature should be sufficient to provide a smooth, well-defined, V-shaped groove in the rod without curing it to the point where it is unformable. The embossing temperature is a function of the particular thermoset resin chosen and the rate at which the rods are fed through the embossing tool 20; preferred temperatures range from about 190° F. to 265° F.

Figure 4:
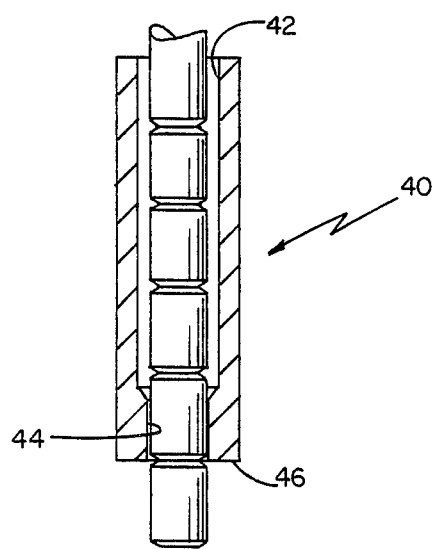
FIG. 4 is a cross-sectional view of a breaker tube for fracturing the cylindrical preforms.

The embossed cylindrical rod from embossing tool 20 is fractured into cylindrical preforms in a cylindrical breaker tube 40 (FIG. 4). Breaker tube 40 includes a feed section 42 into which the embossed rod is inserted. The inside diameter of feed section 42 is preferably about 0.125 to 0.375 inch wider than the embossed rod, so as to permit easy feeding of the embossed rod with minimal friction on the inside surfaces of the feed section. Feed section 42 adjoins a breaker section 44, where the embossed cylindrical rod is fractured; the inside diameter of breaker section 44 is preferably at least 1/32 inch greater than the diameter of the rod. The embossed rod is fractured by extending it through feed section 42 and beyond the bottom edge of breaker section 44 to a point where the V-shaped groove on the embossed rod is even with the bottom of the breaker tube. The preform is then fractured by applying a shear force, or preferably a combination of shear and tensile forces, to the protruding end of the preform, resulting in a fracture starting at the base of the V-shaped groove. The fractured surface of the preform is generally flat and smooth. If a flatter surface is desired, the surface can be treated by either abrasion or by pressure against a heated surface. The preforms thus prepared can then be further processed using conventional techniques, e.g., matched-die molding.

The extrusion temperature and time at elevated temperature are sufficient to plasticate the thermoset resin into a viscous but easily formable shape, but insufficient to cure the resin to the point where it is unformable. The particular extrusion temperature selected will depend on the thermal and rheological properties of the thermoset resin. Typical extrusion temperatures range from about 140° F. to 180° F. Cooling chamber 56 lowers the temperature immediately after extrusion.

OTHER EMBODIMENTS

Other embodiments are within the following claims. For example, other methods for embossing the extruded preforms with V-shaped grooves include sawing, scratching, and heating the preform before cutting it. The extruded preforms can also be cut to the desired lengths with a water jet, which is quite thin (e.g., 0.014 inch) and produces little waste. The preprocessed thermoset resin can be cooled and ground into a powder, and the powder subsequently used as the input to the preform extruder 50; in this case the preform extruder does not require internal cooling.

We claim:

1. A method of preparing preforms for later use in a separate, subsequent molding process, said method comprising the steps of
   preprocessing a thermoset resin by mixing the resin and other constituents without fully curing said resin,
   extruding a rod of said preprocessed thermoset resin without fully curing said resin,
   immediately cooling the extruded rod to retain its uniform shape and to reduce further curing of the resin, and
   transversely cutting or fracturing the cooled rod to yield said preforms, which are not fully cured and which are suitable for being held for later use in a separate, subsequent molding process.

2. The method of claim 1 wherein said extruded rod is cylindrical.

3. The method of claim 1 wherein the diameter of said extruded rod is from about 0.25 to 2 inches.

4. The method of claim 1 wherein the diameter of said extruded rod is from about 0.5 to 1.25 inches.

5. The method of claim 1 wherein said extruded rod is given a plurality of equally-spaced grooves and said rod is fractured at said grooves to yield said preforms.

6. The method of claim 1 wherein said cooling step is achieved by passing said rod through a cooling chamber immediately after said extrusion.

7. The method of claim 6 wherein the diameter of said cooled extruded rod is kept uniform by pulling the rod at a rate controlled by a measurement of the rod diameter.

8. The method of claim 6 wherein said rod is cooled in said cooling chamber by exposing the surface of said rod to cold fluid.

9. The method of claim 1 wherein said thermoset resin is preprocessed in a preprocessing extruder and the output of that extruder is supplied directly to the extruder used to extrude the preforms and wherein the preform extruder has internal cooling for rapidly lowering the temperature of the preprocessed resin.

10. The method of claim 5 wherein said grooves are embossed in said rod.

11. The method of claim 5 wherein said grooves are V-shaped.

12. The method of claim 10 wherein a heated embossing tool is used to emboss said grooves in said rod.

13. The method of claim 1 wherein said rod is extruded through a die having a low-friction liner.

* * * * *